United States Patent
Stellari et al.

(10) Patent No.: US 10,755,397 B2
(45) Date of Patent: Aug. 25, 2020

(54) AUTOMATED FOCUSING OF A MICROSCOPE OF AN OPTICAL INSPECTION SYSTEM

(71) Applicant: International Business Machines Corporation, Armonk, NY (US)

(72) Inventors: Franco Stellari, Waldwick, NJ (US); Chung-Ching Lin, White Plains, NY (US); Peilin Song, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 107 days.

(21) Appl. No.: 15/955,974

(22) Filed: Apr. 18, 2018

(65) Prior Publication Data
US 2019/0325568 A1    Oct. 24, 2019

(51) Int. Cl.
*G06T 5/50* (2006.01)
*G02B 21/24* (2006.01)
(Continued)

(52) U.S. Cl.
CPC ............. *G06T 5/50* (2013.01); *G02B 7/36* (2013.01); *G02B 21/244* (2013.01); *G06T 5/002* (2013.01); *G06T 5/004* (2013.01)

(58) Field of Classification Search
CPC .......... G06T 5/50; G06T 5/002; G06T 5/004; G02B 7/36; G02B 21/244
See application file for complete search history.

(56) References Cited

U.S. PATENT DOCUMENTS

| | | |
|---|---|---|
| 5,302,829 A | 4/1994 | Komatsu et al. |
| 6,175,417 B1 | 1/2001 | Do et al. |
| (Continued) | | |

FOREIGN PATENT DOCUMENTS

WO    2004003601 A2    1/2004

OTHER PUBLICATIONS

Liu, et al., Photo System based on Scanning Electron Microscope for IC Chip Inspection, 2008 International Conference on Optical Instruments and Technology, 2008, 12 Pages, vol. 7159.
(Continued)

*Primary Examiner* — Ruiping Li
(74) *Attorney, Agent, or Firm* — Amin, Turocy & Watson, LLP

(57) ABSTRACT

Systems, computer-implemented methods, and computer program products to focus a microscope. A system can comprise a memory that stores computer executable components and a processor that executes the computer executable components stored in the memory. The computer executable components can comprise an analyzer component that can analyze sub-images of respective sample images to identify one or more sub-images having a maximized variance of a gradient derivative corresponding to the one or more sub-images. The respective sample images can be acquired at one or more focal positions along an optical axis of a microscope. The computer executable components can further comprise a selection component that can select an image, from the respective sample images, that comprises the one or more sub-images identified. The computer executable components can also comprise a focus component that, based on a focal position corresponding to the image selected, can focus the microscope to the focal position.

20 Claims, 10 Drawing Sheets

(51) Int. Cl.
  *G06T 5/00* (2006.01)
  *G02B 7/36* (2006.01)

(56) References Cited

U.S. PATENT DOCUMENTS

| | | | |
|---|---|---|---|
| 6,677,565 B1 | 1/2004 | Wahl et al. | |
| 8,000,511 B2 | 8/2011 | Perz | |
| 9,646,732 B2 | 5/2017 | Adler et al. | |
| 2014/0347459 A1* | 11/2014 | Greenfield | G02B 21/361 348/79 |
| 2017/0220000 A1* | 8/2017 | Ozcan | G03H 1/0866 |
| 2019/0391012 A1* | 12/2019 | Kokota | G02B 21/244 |

OTHER PUBLICATIONS

Stellari, et al., Advanced methods and software for enhancing analytical tools capabilities during chip diagnostic and characterization, Int. Symp. for Testing and Failure Analysis (ISTFA), 2012, 8 Pages, Phoenix, AZ.
Wikipedia, Web API, https://en.wikipedia.org/wiki/Web_API, Last Accessed Apr. 2, 2018.
Hamamtsu Photonics, Phemos 1000 emission microscope, https://www.hamamatsu.com/resources/pdf/sys/SSMS0003E_PHEMOS1000.pdf., Last Accessed Apr. 2, 2018.
Autoit Scripting Language, https://www.autoitscript.com, Last Accessed Apr. 2, 2018.
Python, https://www.python.org/, Last Accessed Apr. 2, 2018.
OPENCV Library, https://opencv.org, Last Accessed Apr. 2, 2018.
Winbatch, http://www.winbatch.com/, Last Accessed Apr. 2, 2018.
Autohotkey, https://autohotkey.com, Last Accessed Apr. 2, 2018.
Matlab, https://www.mathworks.com/, Last Accessed Apr. 2, 2018.
Flask Web Development, http://flask.pocoo.org, Last Accessed Apr. 2, 2018.
IBM Bluemix Cloud, https://console.bluemix.net/, Last Accessed Apr. 2, 2018.
Lin, Automated Mapping of Very Large Areas of VLSI Circuit using SIL, Int. Symp. for Testing and Failure Analysis (ISTFA), 2014, 7 Pages.
Photo Review, Sharpness, Acutance and Resolution, http://www.photoreview.com.au/tips/shooting/sharpness,- acutance-and-resolution, Last Accessed Apr. 2, 2018.
OPENCV, Histogram Equalization, https://docs.opencv.org/3.1.0/d5/daf/tutorial_py_histogram_equalization.html, Last Accessed Apr. 2, 2018.
OPENCV, Image gradients calculations, https://docs.opencv.org/3.0-beta/doc/py_tutorials/py_imgproc/py_gradients/py_gradients.html, Last Accessed Apr. 2, 2018.
OPENCV, Feature Detection and Description, https://docs.opencv.org/3.0-beta/doc/py_tutorials/affinepy_feature2d/py_table_of contents_feature2d/py_table_of contents_feature2d.html, Last Accessed Apr. 2, 2018.
Derpanis, The Harris corner detector, Oct. 27, 2004, 2 Pages.
Bay, et al., Surf: Speeded up robust features, European conference on computer vision, 2006, pp. 404-417.
OPENCV, Geometric Transformation of Images. https://doc,s.opencv.org/3.0-beta/dodpy_tutorials/py_imgproc/py_geometric_transformations/py_geometric_transformations.html, Last Accessed Apr. 2, 2018.
Wikipedia, Radon Transform, https://en.wikipedia.org/wiki/Radon_transform, Last Accessed Apr. 2, 2018.

\* cited by examiner

AUTOMATED FOCUSING OF A MICROSCOPE OF AN OPTICAL INSPECTION SYSTEM

BACKGROUND

The subject disclosure relates to microscope systems, and more specifically, to focusing a microscope of an optical inspection system.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate a microscope focusing process are described.

According to an embodiment, a system can comprise a memory that stores computer executable components and a processor that executes the computer executable components stored in the memory. The computer executable components can comprise an analyzer component that can analyze sub-images of respective sample images to identify one or more sub-images having a maximized variance of a gradient derivative corresponding to the one or more sub-images. The respective sample images can be acquired at one or more focal positions along an optical axis of a microscope. The computer executable components can further comprise a selection component that can select an image, from the respective sample images, that comprises the one or more sub-images identified. The computer executable components can also comprise a focus component that, based on a focal position corresponding to the image selected, can focus the microscope to the focal position.

According to another embodiment, a computer-implemented method can comprise, in response to acquiring sample images at one or more focal positions along an optical axis of a microscope, identifying, by a system operatively coupled to a processor, one or more sub-images, partitioned from the sample images, that comprise a maximized variance of a gradient derivative corresponding to the one or more sub-images. The computer-implemented method can further comprise, based on the one or more sub-images identified, selecting, by the system, an image from the sample images. The computer-implemented method can also comprise, based on a focal position corresponding to the image selected, focusing, by the system, the microscope to the focal position.

According to yet another embodiment, a computer program product that can facilitate a microscope focusing process is provided. The computer program product can comprise a computer readable storage medium having program instructions embodied therewith, the program instructions can be executable by a processing component to cause the processing component to, identify, by the processor, one or more sub-images, partitioned from sample images, that comprise a maximized variance of a gradient derivative corresponding to the one or more sub-images. The program instructions can further cause the processing component to, based on the one or more sub-images identified, select, by the processor, an image from the sample images. The program instructions can also cause the processing component to, based on a focal position corresponding to the image selected, focus, by the processor, the microscope to the focal position.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1:
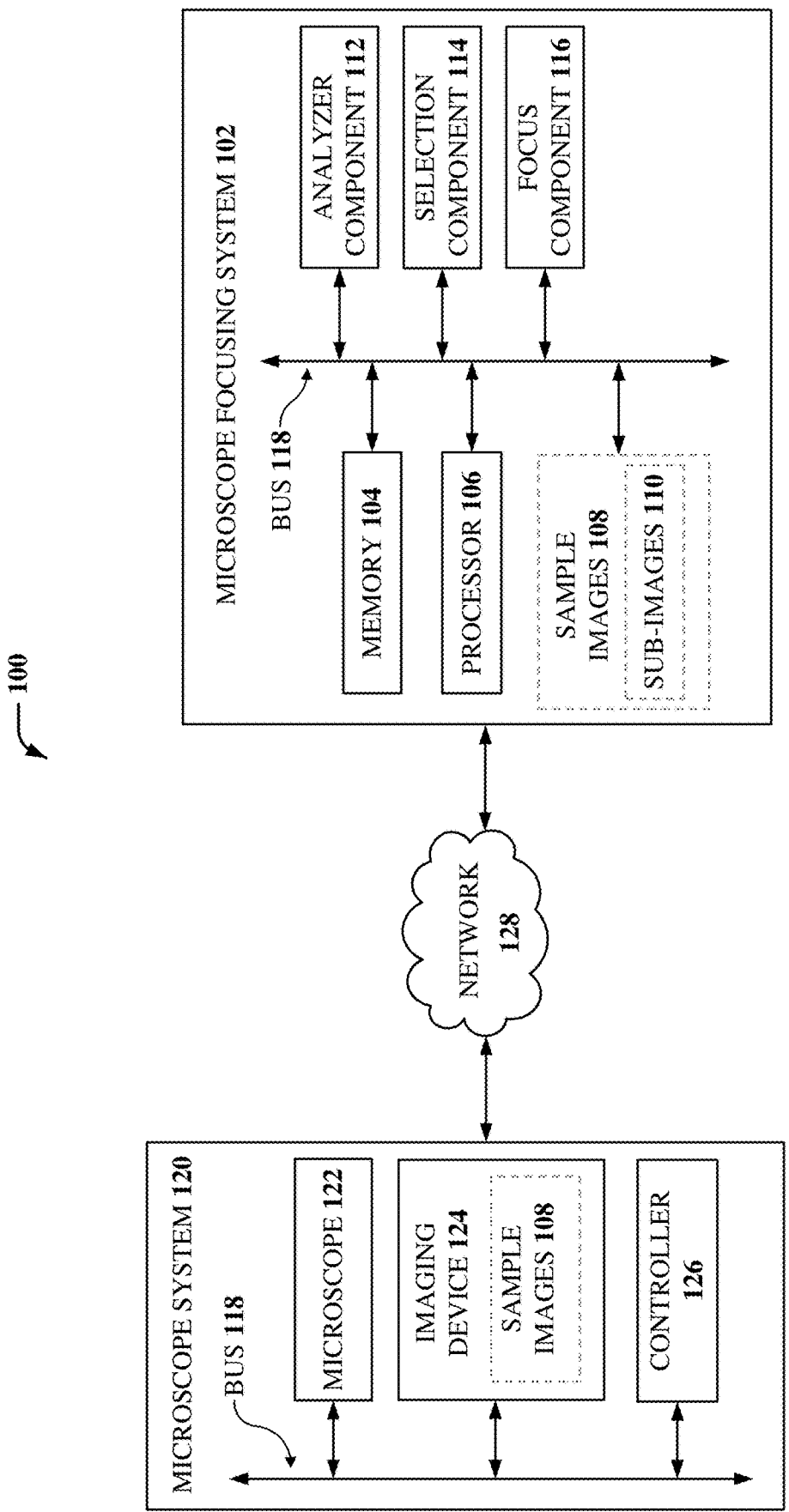
FIG. 1 illustrates a block diagram of an example, non-limiting system that facilitates microscope focusing components in accordance with one or more embodiments described herein.

FIG. 1 illustrates a block diagram of an example, non-limiting system 100 that facilitates microscope focusing components in accordance with one or more embodiments described herein. According to several embodiments, system 100 can comprise a microscope focusing system 102. In some embodiments, microscope focusing system 102 can comprise a memory 104, a processor 106, sample images 108, an analyzer component 112, a selection component 114, a focus component 116, and/or a bus 118. In some embodiments, sample images 108 can comprise one or more sub-images 110.

According to some embodiments, microscope focusing system 102 can be in communication with a microscope system 120 via a network 128. In several embodiments, microscope system 120 can comprise a microscope 122, an imaging device 124, a controller 126, and/or bus 118. In some embodiments, imaging device 124 can comprise sample images 108. In some embodiments, microscope system 120 and/or controller 126 can comprise, employ, and/or be coupled to (e.g., communicatively, electrically, operatively, etc.) microscope focusing system 102 and/or one or more components associated with microscope focusing system 102 (e.g., sample images 108, sub-images 110, analyzer component 112, selection component 114, focus component 116, etc.). For example, microscope system 120 can comprise microscope focusing system 102 and/or one or more components associated therewith. In such an example, microscope system 120 and/or controller 126 can be communicatively, electrically, and/or operatively coupled to microscope focusing system 102 via bus 118 to perform functions of system 100, microscope focusing system 102 (and/or any components associated therewith), and/or microscope system 120 (and/or any components associated therewith).

It should be appreciated that the embodiments of the subject disclosure depicted in various figures disclosed herein are for illustration only, and as such, the architecture of such embodiments are not limited to the systems, devices, aspects, and/or components depicted therein. For example, in some embodiments, system 100, microscope focusing system 102, and/or microscope system 120 can further comprise various computer and/or computing-based elements described herein with reference to operating environment 1000 and FIG. 10. In several embodiments, such computer and/or computing-based elements can be used in connection with implementing one or more of the systems, devices, aspects, and/or components shown and described in connection with FIG. 1 or other figures disclosed herein.

According to several embodiments, memory 104 can store one or more computer and/or machine readable, writable, and/or executable components and/or instructions that, when executed by processor 106, can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to microscope focusing system 102, sample images 108, sub-images 110, analyzer component 112, selection component 114, focus component 116, microscope system 120, microscope 122, imaging device 124, and/or controller 126.

In several embodiments, memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 1016 and FIG. 10. Such examples of memory 104 can be employed to implement any embodiments of the subject disclosure.

According to some embodiments, processor 106 can comprise one or more types of processors and/or electronic circuitry that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, and/or the like.

In some embodiments, microscope focusing system 102, memory 104, processor 106, sample images 108, analyzer component 112, selection component 114, and/or focus component 116 can be communicatively, electrically, and/or operatively coupled to one another via a bus 118 to perform functions of system 100, microscope focusing system 102, and/or any components coupled therewith. In some embodiments, microscope system 120, microscope 122, imaging device 124, and/or controller 126 can be communicatively, electrically, and/or operatively coupled to one another via bus 118 to perform functions of system 100, microscope system 120, and/or any components coupled therewith. In several embodiments, bus 118 can comprise one or more memory bus, memory controller, peripheral bus, external bus, local bus, and/or the like that can employ various bus architectures. Further examples of bus 118 are described below with reference to system bus 1018 and FIG. 10. Such examples of bus 118 can be employed to implement any embodiments of the subject disclosure.

In several embodiments, microscope focusing system 102 can comprise one or more computer and/or machine readable, writable, and/or executable components and/or instructions that, when executed by processor 106, can facilitate performance of operations defined by such component(s) and/or instruction(s). Further, in numerous embodiments, any component associated with microscope focusing system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, analyzer component 112, selection component 114, and/or focus component 116, and/or any other components associated with (e.g., communicatively/electronically/operatively coupled with and/or employed by) microscope focusing system 102, can comprise such computer and/or machine readable, writable, and/or executable component(s) and/or instruction(s). Consequently, according to numerous embodiments, microscope focusing system 102 and/or any components associated therewith, can employ processor 106 to execute such computer and/or machine readable, writable, and/or executable component(s) and/or instruction(s) to facilitate performance of one or more operations described herein with reference to microscope focusing system 102 and/or any such components associated therewith.

According to multiple embodiments, microscope focusing system 102 can facilitate performance of operations related to and/or executed by sample images 108, sub-images 110, analyzer component 112, selection component 114, focus component 116, microscope system 120, microscope 122, imaging device 124, and/or controller 126. For example, as described in detail below, microscope focusing system 102 can facilitate: partitioning sample images 108 into sub-images 110; independently analyzing one or more sub-images 110 to identify one or more sub-images 110 having a maximized variance of a gradient derivative corresponding to one or more sub-images 110; selecting an image, from the respective sample images 108, that comprises the one or more sub-images 110 identified; and/or based on a focal position corresponding to the image selected, focusing microscope 122 to the focal position (e.g., a focal position along an optical axis of microscope 122).

In some embodiments, microscope focusing system 102 can comprise one or more physical world computing devices (e.g., a computer, a laptop, smart phone, etc.). In some embodiments, microscope focusing system 102 can be coupled to (e.g., communicatively, electrically, operatively, etc.) and/or employed by one or more physical world computing devices (e.g., a computer, a laptop, smart phone, etc.). In some embodiments, microscope focusing system 102 can comprise one or more virtual computing resources (e.g., a virtual computing resource of a cloud computing environment). In some embodiments, microscope focusing system 102 can be coupled to (e.g., communicatively, electrically, operatively, etc.) and/or employed by one or more virtual computing resources (e.g., a virtual computing resource of a cloud computing environment).

In FIG. 1, sample images 108 and sub-images 110 are depicted with dashed lines to indicate that, according to some embodiments, these components can be received by and/or transmitted by microscope focusing system 102 (e.g., via one or more networks 128 and/or bus 118, for example, in embodiments where microscope system 120 comprises microscope focusing system 102 as described above). According to numerous embodiments, microscope focusing system 102 can receive and/or retrieve one or more sample images 108 from microscope system 120. For example, microscope focusing system 102 can receive and/or retrieve sample images 108 (e.g., via network 128) from microscope focusing system 102, microscope 122, imaging device 124, and/or controller 126. In some embodiments, microscope system 120 can employ microscope 122 to view and/or inspect a Device Under Test (DUT) and can further employ imaging device 124 to acquire/capture one or more sample images 108 of such DUT viewed and/or inspected via microscope 122.

In some embodiments, sample images 108 can comprise one-dimensional and/or multidimensional (e.g., two-dimensional, three-dimensional, etc.) electronic images, digital images, analog images, and/or other images, that can be formatted in a computer and/or machine readable, writable, and/or executable format and/or a human readable format. For example, sample images 108 can be formatted as one or more image files including, but not limited to, Tagged Image File Format (TIFF), Joint Photographic Experts Group (JPEG), Graphics Interchange Format (GIF), Portable Network Graphics (PNG), Raw Image File, and/or another image file. In some embodiments, sample images 108 can comprise images of various formats (e.g., black and white images, grayscale images, etc.). In some embodiments, sample images 108 can comprise images formatted in various bit depths. For instance, sample images 108 can comprise images formatted in bit depths including, but not limited to, 1-bit, 8-bit, 16-bit, and/or another bit depth format. In some embodiments, sample images 108 can comprise still images (e.g., static images). In some embodiments, sample images 108 can comprise moving images, kinetic images, and/or live images (e.g., images acquired during live video captured by imaging device 124 in real-time).

In several embodiments, sample images 108 can comprise and/or illustrate reflected-light pattern images and/or laser scanning microscope images of one or more DUT and/or other images of a DUT captured by microscope 122 and/or imaging device 124. In some embodiments, sample images 108 can comprise and/or illustrate reflected-light pattern images of a DUT, such as, for example, an electronic device and/or an electronic microdevice. For instance, such electronic device and/or electronic microdevice can include, but are not limited to, a semiconductor integrated circuit, a semiconductor integrated circuit package, a semiconductor integrated circuit assembly, a semiconductor integrated circuit wafer, a semiconductor integrated circuit die, a printed circuit board (PCB), a multi-chip module (MCM), a system-in-package (SIP), a three-dimensional integrated circuit (3D IC) package/assembly, a 2.5D integrated circuit package/assembly, and/or other electronic devices/microdevices comprising microscopic structures.

According to multiple embodiments, sample images 108 can correspond to various magnification powers of microscope 122. For example, sample images 108 can correspond to magnification powers of microscope 122 that can include, but are not limited to, 2.5× magnification, 5× magnification, 20× magnification, and/or another magnification power. In several embodiments, sample images 108 can correspond to respective focal positions along an optical axis (e.g., Z-axis) of microscope 122. For example, imaging device 124 can capture sample images 108 at various focal positions and/or focal distances along the optical axis/Z-axis of microscope 122 (e.g., various focal distances measured between an objective of microscope 122 and a stage of microscope 122). For instance, microscope 122 can comprise an objective (e.g., an optical component that collects light from an object being viewed and focuses the light rays to generate a real image), an ocular/eyepiece (e.g., an optical component that magnifies the real image generated by the objective), and/or a stage (e.g., a structural component upon which an object being viewed is positioned). In such an example, microscope system 120 can facilitate moving the stage along the optical axis/Z-axis of microscope 122 (e.g., via controller 126) and/or adjusting the objective and/or the ocular/eyepiece (e.g., via controller 126). In this example, microscope system 120 can further facilitate capturing sample images 108 at various focal positions and/or focal distances along such axis (e.g., via imaging device 124 and controller 126).

According to multiple embodiments, microscope focusing system 102 can employ analyzer component 112 to analyze and/or process one or more individual sample images 108 and/or one or more individual sub-images 110. For example, analyzer component 112 can employ one or more image gradient calculation methodologies (e.g., gradient derivatives) to determine a pixel-by-pixel image gradient corresponding to one or more individual sample images 108 and/or one or more individual sub-images 110. As referenced herein, the term "image gradient" can refer to a change in the direction of the intensity and/or pixel intensity values of an image. In some embodiments, such image gradient calculation methodologies can include gradient derivatives, such as, for example, Laplacian derivative, Sobel derivative, Scharr derivative, and/or another gradient derivative that can determine a pixel-by-pixel image gradient corresponding to an image. In some embodiments, analyzer component 112 can employ one or more such gradient derivatives to determine a pixel-by-pixel acutance of one or more individual sample images 108 and/or one or more individual sub-images 110. As referenced herein, the term "acutance" can refer to the amplitude of a gradient corresponding to a pixel of an image.

In several embodiments, analyzer component 112 can further determine and/or employ one or more global parameters of the one or more gradient derivatives described above to analyze sample images 108 and/or sub-images 110. For example, analyzer component 112 can determine and/or employ global parameters including, but not limited to, maximum, minimum, mean, standard deviation, variance, and/or another global parameter of the gradient derivatives of respective sample images 108 and/or respective sub-images 110. In some embodiments, analyzer component 112 can determine and/or employ the variance of the gradient derivatives of respective sample images 108 and/or respective sub-images 110 to determine a focus quality figure of merit that can serve as a baseline to which one or more sample images 108 and/or one or more sub-images 110 can be compared. As referenced herein, the term "figure of merit" can refer to a quantity (e.g., a scalar value) that characterizes the focus quality of an image relative to other images).

According to some embodiments, analyzer component 112 can utilize Laplacian derivative(s) to determine pixel-by-pixel image gradients and/or acutance corresponding to respective sample images 108. In such embodiments, analyzer component 112 can further determine the variance of such Laplacian derivative(s) corresponding to such respective sample images 108. In these embodiments, analyzer component 112 can compare the variance of Laplacian derivative(s) corresponding to an individual sample image 108 to one or more other variances of Laplacian derivative(s) corresponding to one or more other individual sample images 108 to identify an image of such sample images 108 having a maximized variance of the Laplacian derivative(s) corresponding to such sample images 108 (e.g., to identify an image having a variance that is greater in magnitude/value relative to the variances corresponding to the other sample images 108).

In some embodiments, sample images 108 can comprise and/or illustrate one or more elements/features corresponding to various respective optimal focal positions along an optical axis/Z-axis of microscope 122. For example, sub-images 110 can comprise and/or illustrate elements/features including, but not limited to, debris particles (e.g., dust, glue, fingerprints, etc.) on a surface of a DUT, surfaces at an edge of a DUT, and/or a sharp transition at an edge of a DUT. In this example, such elements/features can correspond to different respective optimal focal positions, such that an optimal focal position for viewing and/or inspecting a certain element/feature (e.g., a debris particle) is different from an optimal focal position for viewing and/or inspecting a DUT and/or another element/feature (e.g., an edge of a DUT).

Consequently, according to several embodiments, microscope focusing system 102 can facilitate partitioning individual sample images 108. For example, microscope focusing system 102 can facilitate partitioning one or more individual sample images 108 into one or more sub-images 110. In some embodiments, microscope focusing system 102 can facilitate partitioning sample images 108 into equally sized sub-images 110 (e.g., where sub-images 110 can be sized based on the size of the one or more elements/features described above that correspond to various respective optimal focal positions along an optical axis/Z-axis of microscope 122). For instance, microscope focusing system 102 can apply one or more grid patterns to the individual sample images 108 (e.g., grid pattern(s) comprising 4×4 sub-images, 5×5 sub-images, 6×6 sub-images, etc.). In some embodiments, the partitions obtained from such grid pattern(s) can constitute sub-images 110.

According to some embodiments, analyzer component 112 can utilize Laplacian derivative(s) to determine pixel-by-pixel image gradients and/or acutance corresponding to respective sub-images 110. In such embodiments, analyzer component 112 can further determine the variance of such Laplacian derivative(s) corresponding to such respective sub-images 110. In these embodiments, analyzer component 112 can compare the variance of Laplacian derivative(s) corresponding to an individual sub-image 110 to one or more other variances of Laplacian derivative(s) corresponding to one or more other individual sub-images 110 to identify a sub-image of such sub-images 110 having a maximized variance of the Laplacian derivative(s) corresponding to such sub-images 110 (e.g., to identify an image having a variance that is greater in magnitude/value relative to the variances corresponding to the other sub-images 110).

According to multiple embodiments, microscope focusing system 102 can employ selection component 114 to select an image, from sample images 108, having a maximized variance of the Laplacian derivative(s) corresponding to such image (e.g., as described above). In several embodiments, microscope focusing system 102 can employ selection component 114 to select an image, from sample images 108, that comprises one or more sub-images 110 having a maximized variance of the Laplacian derivative(s) corresponding to such one or more sub-images 110 (e.g., as described above).

In some embodiments, selection component 114 can execute such selection described above based on certain criteria. For example, selection component 114 can select an image, from sample images 108, based on a quantity of sub-images 110 identified in such image as having a maximized variance of the Laplacian derivative(s) (e.g., identified by analyzer component 112 as described above). For instance, selection component 114 can select an image, from sample images 108, that comprises the largest quantity (e.g., relative to other images of sample images 108) of sub-images 110 having a maximized variance of the Laplacian derivative(s) corresponding to such sub-images 110.

In some embodiments, selection component 114 can select an image, from sample images 108, based on a ranking value assigned to one or more sub-images 110 identified in such image as having a maximized variance of the Laplacian derivative(s) (e.g., identified by analyzer component 112 as described above). For example, microscope focusing system 102, analyzer component 112, and/or selection component 114 can facilitate assigning a ranking value (e.g., a scalar value, a binary value, etc.) to individual sub-images 110 based on the content illustrated in such sub-images 110 (e.g., whether such sub-images 110 comprise/illustrate a DUT, a portion of such DUT, and/or other elements/features, such as debris particles). For instance, a high-ranking value (e.g., a numerical value of 10) can be assigned (e.g., via microscope focusing system 102, analyzer component 112, and/or selection component 114) to individual sub-images 110 comprising/illustrating only a DUT or a portion thereof. As another example, a median-ranking value (e.g., a numerical value of 5) can be assigned (e.g., by microscope focusing system 102, analyzer component 112, and/or selection component 114) to individual sub-images 110 comprising/illustrating a DUT, or a portion thereof, and one or more of the elements/features described above that correspond to various respective optimal focal positions along an optical axis/Z-axis of microscope 122

(e.g., debris particles (e.g., dust, glue, fingerprints, etc.) on a surface of a DUT, surfaces at an edge of a DUT, a sharp transition at an edge of a DUT, etc.). As yet another example, a low-ranking value (e.g., a numerical value of 1) can be assigned (e.g., by microscope focusing system 102, analyzer component 112, and/or selection component 114) to individual sub-images 110 comprising/illustrating only such one or more elements/features described above that correspond to various respective optimal focal positions along an optical axis/Z-axis of microscope 122 (e.g., debris particles (e.g., dust, glue, fingerprints, etc.) on a surface of a DUT, surfaces at an edge of a DUT, a sharp transition at an edge of a DUT, etc.).

In several embodiments, microscope focusing system 102 can facilitate storing one or more sample images 108, one or more sub-images 110, one or more selected images (e.g., selected by selection component 114 as described above), and/or one or more focal positions corresponding to such sample images 108, sub-images 110, and/or selected images. For example, microscope focusing system 102 can facilitate storing such images, and/or focal positions corresponding to such images, on a local storage component (e.g., memory 104) and/or a remote storage component. For instance, microscope focusing system 102, and/or components associated therewith (e.g., analyzer component 112, selection component 114, focus component 116, etc.), can employ memory 104 to store such images and/or focal positions corresponding to such images. For example, microscope focusing system 102, and/or components associated therewith, can employ memory 104 to store such images as one or more image files (e.g., TIFF, JPEG, GIF, PNG, Raw Image File, etc.) and/or to store focal positions corresponding to such images as one or more text files (e.g., plain text file, formatted text file, etc.).

According to multiple embodiments, microscope focusing system 102 can employ focus component 116 to facilitate focusing microscope 122 to a focal position corresponding to the image selected (e.g., the image identified by analyzer component 112 and/or selected by selection component 114, as described above). For example, microscope focusing system 102 and/or focus component 116 can facilitate focusing microscope 122 to the focal position along the optical axis/Z-axis of microscope 122 where the image selected by selection component 114 was acquired/captured (e.g., by imaging device 124).

In some embodiments, microscope focusing system 102 and/or focus component 116 can facilitate focusing microscope 122 to the focal position along the optical axis/Z-axis of microscope 122 that corresponds to the selected image by moving a stage of microscope 122 to such focal position. For example, microscope focusing system 102 and/or focus component 116 can employ controller 126 to facilitate moving a stage of microscope 122 to such focal position. In some embodiments, microscope focusing system 102 and/or focus component 116 can facilitate focusing microscope 122 to the focal position along the optical axis/Z-axis of microscope 122 that corresponds to the selected image by adjusting an objective and/or an eyepiece of microscope 122 to such focal position. For example, microscope focusing system 102 and/or focus component 116 can employ controller 126 to facilitate adjusting an objective and/or an eyepiece of microscope 122 to such focal position.

According to some embodiments, microscope focusing system 102 and/or focus component 116 can facilitate focusing microscope 122 to the focal position along the optical axis/Z-axis of microscope 122 that corresponds to the selected image by transmitting (e.g., via network 128 and/or bus 118) the image selected, and/or the focal position corresponding to the image selected, to microscope system 120, microscope 122, and/or controller 126. In such embodiments, in response to receiving the image selected, and/or the focal position corresponding to the image selected, the microscope system 120, microscope 122, and/or controller 126 can facilitate: moving a stage of microscope 122 to such focal position; adjusting an objective of microscope 122 to such focal position; and/or adjusting an eyepiece of microscope 122 to such focal position.

In several embodiments, microscope system 120 can comprise an optical inspection system/tool and/or an optical imaging system (e.g., a specialized optical imaging system, generalized optical imaging system, automated optical imaging system, etc.). For example, microscope system 120 can comprise an optical inspection system/tool that can include, but is not limited to, an optical microscopy system/tool, a high-resolution emission microscope system/tool, an automated optical inspection system/tool, and/or another optical inspection system/tool that can be employed to view and/or inspect an object, such as a DUT, for example.

In some embodiments, microscope 122 can comprise any type of machine and/or computer-controlled microscope suitable for integration with microscope system 120 (e.g., integration with an optical inspection system/tool described above) and/or any type of standalone microscope that can be coupled (e.g., communicatively, electrically, operatively, etc.) to microscope system 120. For example, microscope 122 can comprise a microscope that can include, but is not limited to, an optical microscope, a laser scanning microscope, and/or another type of microscope that can be employed to view and/or inspect an object, such as a DUT, for example, and/or that can be focused as described above.

In multiple embodiments, imaging device 124 can comprise any type of machine and/or computer-controlled imaging device suitable for integration with microscope system 120 (e.g., integration with an optical inspection system/tool described above) and/or any type of standalone imaging device that can be coupled (e.g., communicatively, electrically, operatively, etc.) to microscope system 120 to acquire/capture sample images 108. For example, imaging device 124 can comprise an imaging device that can include, but is not limited to, a microscope/microscopy camera, digital camera, video camera, and/or another type of camera that can acquire/capture sample images 108.

According to some embodiments, controller 126 can comprise any type of special-purpose or general-purpose computing device suitable for integration with microscope system 120 (e.g., integration with an optical inspection system/tool described above) and/or any type of standalone special-purpose or general-purpose computing device that can be coupled (e.g., communicatively, electrically, operatively, etc.) to microscope system 120. For example, controller 126 can comprise one or more computing devices (e.g., a computer, a laptop, smart phone, virtual computing resource, etc.). In some embodiments, controller 126 can be coupled to (e.g., communicatively, electrically, operatively, etc.) and/or employed by one or more computing devices (e.g., a computer, a laptop, smart phone, etc.).

In some embodiments, controller 126 can comprise a memory component (e.g., memory 104) that can store one or more computer and/or machine readable, writable, and/or executable components and/or instructions that, when executed by a processor component (e.g., processor 106), can facilitate performance of operations defined by such component(s) and/or instruction(s). In some embodiments, controller 126 can comprise, employ, and/or be coupled to (e.g., communicatively, electrically, operatively, etc.) microscope focusing system 102 and/or one or more components associated with microscope focusing system 102 (e.g., sample images 108, sub-images 110, analyzer component 112, selection component 114, focus component 116, etc.). For example, microscope system 120 can comprise bus 118, microscope 122, imaging device 124, controller 126, microscope focusing system 102, and/or one or more components associated with microscope focusing system 102. In such an example, controller 126 can be communicatively, electrically, and/or operatively coupled to microscope focusing system 102 via bus 118, for example, to perform operations described herein with reference to microscope focusing system 102 and/or any components associated therewith (e.g., sample images 108, sub-images 110, analyzer component 112, selection component 114, focus component 116, etc.). Additionally or alternatively, controller 126 can be communicatively, electrically, and/or operatively coupled to microscope focusing system 102 via an internal communication bus of a computing device (e.g., a general-purpose computer, laptop, etc.) and/or a specialized interface based on a computer board for performing and/or controlling operations described herein with reference to microscope focusing system 102 and/or any components associated therewith (e.g., moving a stage of microscope 122, adjusting an objective/eyepiece of microscope 122, and/or adjusting/moving a frame grabber board to control image acquisition by imaging device 124).

In some embodiments, network 128 can include one or more wired and/or wireless networks, including, but not limited to, a cellular network, a wide area network (WAN) (e.g., the Internet) or a local area network (LAN). For example, network 128 can comprise wired or wireless technology including, but not limited to: wireless fidelity (Wi-Fi), global system for mobile communications (GSM), universal mobile telecommunications system (UMTS), worldwide interoperability for microwave access (Wi-MAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols. In such an example, microscope focusing system 102 can thus include hardware (e.g., central processing unit (CPU), transceiver, decoder, etc.), software (e.g., set of threads, set of processes, software in execution, etc.) or a combination of hardware and software that facilitates communicating information between microscope focusing system 102 and external systems, sources, and/or devices.

Figure 2:
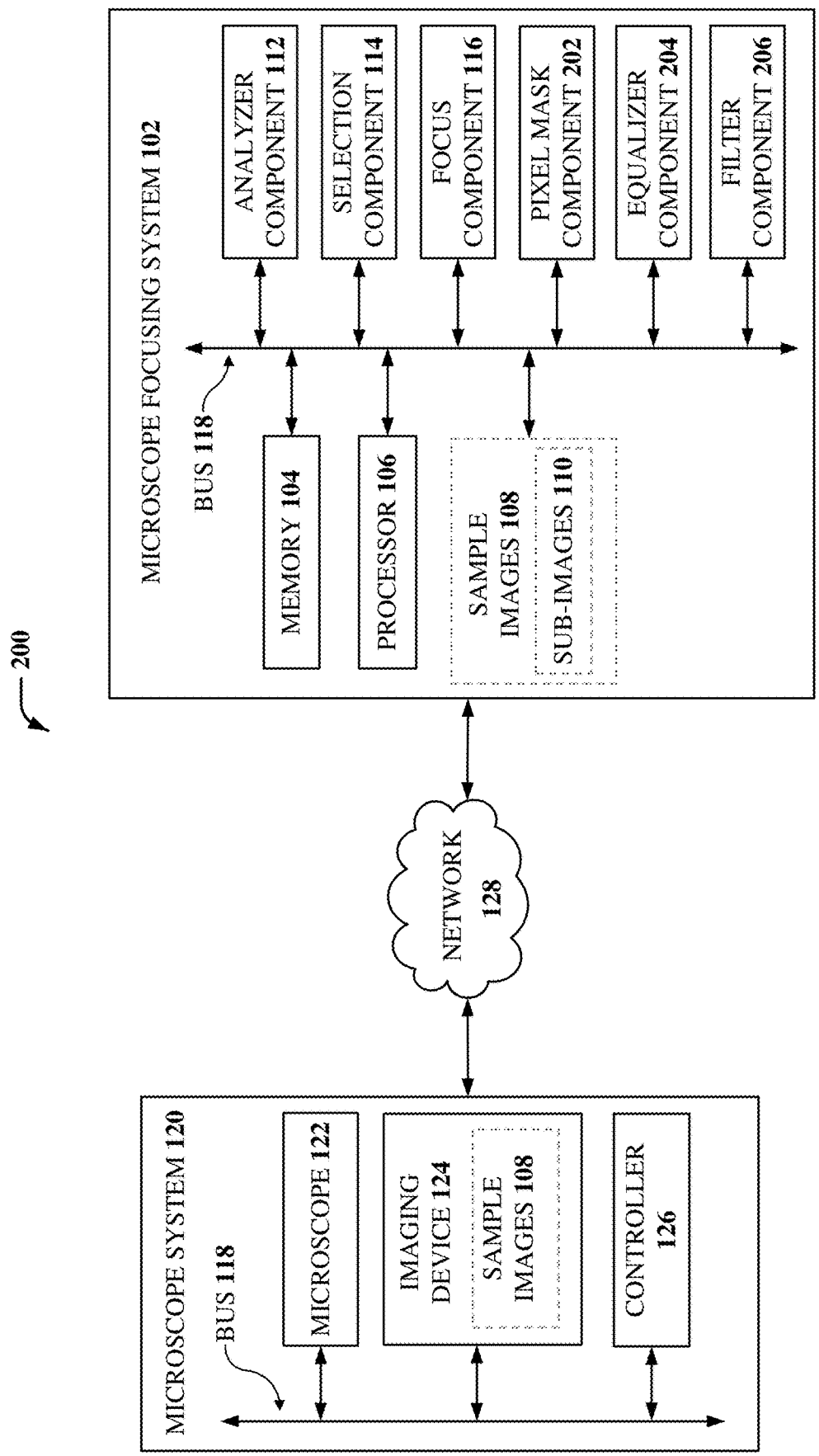
FIG. 2 illustrates a block diagram of an example, non-limiting system that facilitates microscope focusing components in accordance with one or more embodiments described herein.

FIG. 2 illustrates a block diagram of an example, non-limiting system 200 that facilitates microscope focusing components in accordance with one or more embodiments described herein. Repetitive description of like elements employed in respective embodiments is omitted for sake of brevity. According to several embodiments, system 200 can comprise a microscope focusing system 102. In some embodiments, microscope focusing system 102 can comprise a pixel mask component 202, an equalizer component 204, and/or a filter component 206.

According to numerous embodiments, microscope focusing system 102 can employ pixel mask component 202 to generate a pixel mask that can mask, exclude, and/or remove one or more pixel locations of respective sample images 108 and/or respective sub-images 110. For example, imaging device 124 can comprise one or more malfunctioning pixels (e.g., damaged pixels, stuck pixels, hot pixels, etc.) and during acquiring/capturing sample images 108, such malfunctioning pixels can result in one or more artifacts on sample images 108. As referenced herein, the term "artifact" can refer to an unwanted feature not originally present or expected on sample images 108 that can be caused by equipment utilized during a scientific investigation (e.g., imaging device 124). In some embodiments, such artifacts can cause high gradients that can dominate and/or skew a gradient derivative (e.g., a Laplacian derivative) corresponding to one or more sample images 108 and/or sub-images 110.

In several embodiments, pixel mask component 202 can facilitate generating a pixel mask by defocusing a sample image 108 comprising an image of a backside surface of a DUT (e.g., a semiconductor integrated circuit wafer/die/chip) to locate one or more artifacts appearing on such defocused sample image 108. For example, microscope focusing system 102 and/or pixel mask component 202 can employ imaging device 124 to acquire/capture a sample image 108 of a backside surface of such DUT, and pixel mask component 202 can facilitate defocusing such sample image 108. In such an example, pixel mask component 202 can facilitate locating one or more artifacts appearing on such defocused sample image 108. For instance, pixel mask component 202 can employ analyzer component 112 to identify portions of such defocused sample image 108 having high gradients (e.g., as described above with reference to analyzer component 112 and FIG. 1).

According to some embodiments, pixel mask component 202 can facilitate masking one or more artifacts appearing on a sample image 108, a sub-image 110, and/or an image/sub-image comprising image gradients determined by analyzer component 112 (e.g., via applying a Laplacian derivative), by superimposing, over such artifacts, a layer of one or more single/multidimensional objects and/or shapes having solid fill schemes (e.g., two-dimensional solid fill black squares). In some embodiments, such a superimposed layer can be formatted as one or more image files that can be the same as, similar to, and/or different from the format of sample image 108 (e.g., TIFF, JPEG, GIF, PNG, Raw Image File, etc.). In some embodiments, such a superimposed layer can constitute a pixel mask.

In several embodiments, microscope focusing system 102 and/or pixel mask component 202 can facilitate storing one or more such superimposed layers/pixel masks. For example, microscope focusing system 102 and/or pixel mask component 202 can facilitate storing one or more pixel masks on a local storage component and/or a remote storage component. For instance, microscope focusing system 102 and/or pixel mask component 202 can employ memory 104 to store such pixel masks as one or more image files (e.g., TIFF, JPEG, GIF, PNG, Raw Image File, etc.).

In some embodiments, pixel mask component 202 can apply one or more pixel masks to one or more sample images 108 and/or sub-images 110 to mask, exclude, and/or remove malfunctioning pixels having high gradients from the analysis of such images as executed by analyzer component 112 (e.g., as described above). For example, pixel mask component 202 can apply a pixel mask stored on memory 104 to a sample image 108 and/or sub-image 110 before such images are analyzed by analyzer component 112. In some embodiments, pixel mask component 202 can generate and/or apply such a pixel mask to a sample image 108 and/or sub-image 110 in response to analyzer component 112 determining an image gradient for such image/sub-image (e.g., via applying a Laplacian derivative). For instance, pixel mask component 202 can apply a pixel mask to an image comprising an image gradient determined by analyzer component 112 (e.g., as opposed to applying such a pixel mask to a "raw" sample image 108 and/or sub-image 110). In such an example, pixel mask component 202 can facilitate removing/masking one or more portions of such image gradient before analyzer component 112 determines and/or employs a variance of such image gradient (e.g., such that the removed/masked portions are not included in the analyzer component 112 analysis of the variance).

According to several embodiments, microscope focusing system 102 can employ equalizer component 204 to set one or more image attributes of sample images 108 and/or sub-images 110 to one or more constant settings. For example, equalizer component 204 can set one or more image attributes of a sample image 108 acquired/captured at a certain focal position along an optical axis/Z-axis of microscope 122. Examples of such one or more image attributes can include, but are not limited to, image contrast, image grayscale, image luminance, image brightness, image hue, image saturation, and/or another image attribute. In some embodiments, equalizer component 204 can set such one or more image attributes of respective sample images 108 and/or respective sub-images 110 to normalize such images analyzed by analyzer component 112. For example, equalizer component 204 can set such one or more image attributes of respective sample images 108 and/or respective sub-images 110 to normalize such images before such images are analyzed by analyzer component 112.

In some embodiments, equalizer component 204 can apply a histogram equalization technique to equalize/normalize the contrast across an entire image of respective sample images 108 and/or respective sub-images 110. For example, equalizer component 204 can adjust the intensities of an image histogram corresponding to respective sample images 108 and/or respective sub-images 110 to equalize/normalize the contrast across an entire image of such respective sample images 108 and/or respective sub-images 110. For instance, equalizer component 204 can adjust the intensities of an image histogram corresponding to respective sample images 108 and/or respective sub-images 110 before such images are analyzed by analyzer component 112.

In some embodiments, equalizer component 204 can set one or more image attributes of respective sample images 108 and/or respective sub-images 110 to one or more constant settings by disenabling one or more manual and/or automated image attribute adjustment features of microscope system 120, microscope 122, imaging device 124, and/or controller 126. For example, equalizer component 204 can disenable a contrast adjustment feature of microscope 122 and/or imaging device 124 before imaging device 124 acquires/captures sample images 108.

According to several embodiments, microscope focusing system 102 can employ filter component 206 to filter one or more sample images 108 and/or sub-images 110 to reduce and/or eliminate image noise acquired/captured in such images. For example, filter component 206 can apply a high frequency noise filter and/or a low pass filter to sample images 108 and/or sub-images 110 to reduce and/or eliminate such image noise acquired/captured in such images (e.g., by imaging device 124). For instance, filter component 206 can apply a Gaussian filter to sample images 108 and/or sub-images 110 before such images are analyzed by analyzer component 112.

In numerous embodiments, microscope focusing system 102, and/or components associated therewith (e.g., sample images 108, sub-images 110, analyzer component 112, selection component 114, focus component 116, etc.), can be controlled, defined, manipulated, and/or modified by an entity (e.g., an animate entity, such as a human, for example). For instance, microscope focusing system 102, and/or components associated therewith (e.g., sample images 108, sub-images 110, analyzer component 112, selection component 114, focus component 116, etc.), can comprise one or more user interfaces (e.g., graphical user interface (GUI), form-based interface, natural language interface, etc.) that enable an entity (e.g., a human) to input instructions and/or commands to the microscope focusing system 102, and/or components associated therewith. For instance, an entity (e.g., a human) can employ a computing device (e.g., a computer having a keyboard, mouse, and/or monitor) comprising microscope focusing system 102, and/or components associated therewith (e.g., sample images 108, sub-images 110, analyzer component 112, selection component 114, focus component 116, etc.), to input such instructions and/or commands to microscope focusing system 102 and/or components associated therewith (e.g., via a graphical user interface (GUI)). In this example, inputting such instructions and/or commands can facilitate controlling, defining, manipulating, and/or modifying microscope focusing system 102, and/or components associated therewith.

In some embodiments, an entity (e.g., a human) can control, define, manipulate, and/or modify (e.g., as described above) sample images 108, sub-images, 110, selection component 114, pixel mask component 202, equalizer component 204, and/or filter component 206. In some embodiments, an entity can control and/or define partitioning of sample images 108 into sub-images 110. For example, an entity can define the size of the one or more grid patterns (e.g., 4×4 sub-images, 5×5 sub-images, 6×6 sub-images, etc.) microscope focusing system 102 applies to the individual sample images 108. In some embodiments, an entity can define the certain criteria upon which selection component 114 can select (e.g., as described above) an image from sample images 108. For example, an entity can define whether selection component 114 selects an image based on a quantity of sub-images 110 identified in such image as having a maximized variance of the Laplacian derivative(s) or based on a ranking value assigned to one or more sub-images 110 identified in such image as having a maximized variance of the Laplacian derivative(s). In some embodiments, an entity can control pixel mask component 202 and/or define certain attributes of a pixel mask generated by pixel mask component 202. For example, an entity can control pixel mask component 202 by manually locating one or more artifacts appearing on a defocused sample image 108. As another example, an entity can define various attributes of a superimposed layer constituting a pixel mask as described above (e.g., an entity can define the type of objects/shapes, fill pattern schemes of such objects/shapes, etc.). In some embodiments, an entity can control how equalizer component 204 equalizes/normalizes one or more image attributes of sample images 108 and/or sub-images 110. For example, an entity can define which image attributes (e.g., image contrast, image grayscale, etc.) equalizer component 204 can set to equalize/normalize such attributes across sample images 108 and/or sub-images 110. In some embodiments, an entity can define a certain noise filter that can be applied by filter component 206 to reduce/eliminate image noise acquired/captured in sample images 108 and/or sub-images 110.

In some embodiments, microscope focusing system 102 can be an image processing and microscope focusing system and/or an image processing and microscope focusing process associated with technologies such as, but not limited to, optical inspection technologies, automated optical inspection technologies, microscope technologies, imaging device technologies, image processing technologies, cloud computing technologies, computer technologies, server technologies, information technologies, machine learning technologies, artificial intelligence technologies, digital technologies, data analysis technologies, and/or other technologies. In some embodiments, microscope focusing system 102 can employ hardware and/or software to solve problems that are highly technical in nature, that are not abstract and that cannot be performed as a set of mental acts by a human. For example, microscope focusing system 102 can automatically: analyze individual sub-images of sample images to identify one or more sub-images having a maximized variance of a gradient derivative corresponding to such one or more sub-images; select an image, from the sample images, that comprises the one or more sub-images identified; and/or based on a focal position corresponding to the image selected, focus a microscope to the focal position (e.g., a focal position along an optical axis of microscope).

In some embodiments, microscope focusing system 102 can provide technical improvements to optical inspection systems, automated optical inspection systems, microscope systems, imaging device systems, image processing systems, and/or other systems. For example, microscope focusing system 102 can automatically analyze individual sub-images of sample images (e.g., reflected-light pattern images) acquired/captured at various focal positions along an optical axis of a microscope to determine the optimal focal position to view/inspect a DUT (e.g., via identifying one or more sub-images having a maximized variance of a gradient derivative corresponding to such one or more sub-images), thereby improving performance efficiency and/or effectiveness associated with microscope system 120. Further, microscope focusing system 102 can automatically focus a microscope to such optimal focal position, thereby eliminating the need for an entity to repeatedly and/or dynamically focus an image rendered by a microscope to determine the optimal focal position to view/inspect a DUT.

In some embodiments, microscope focusing system 102 can provide technical improvements to a processing unit (e.g., processor 106, controller 126, and/or a processor associated with controller 126) associated with a microscope system (e.g., microscope system 120) by improving processing performance of the processing unit, improving processing efficiency of the processing unit, and/or reducing an amount of time for the processing unit to perform a focusing process to determine the optimal focal position to view/inspect a DUT. For example, microscope focusing system 102 can receive sample images over a network from a microscope system and automatically analyze such images remotely (e.g., via a virtual computing resource) to determine the optimal focal position to view/inspect a DUT, thereby reducing processing time and/or efficiency associated with a processor (e.g., controller 126 and/or a processor associated with controller 126) tasked with performing a focusing process to determine the optimal focal position to view/inspect a DUT. Further, microscope focusing system 102 can also: adjust image attributes of sample images/sub-images; apply a pixel mask to sample images/sub-images and/or to images comprising an image gradient; and/or apply a high frequency noise filter and/or a low pass filter to sample images/sub-images to reduce and/or eliminate image noise acquired/captured in such images, thereby improving processing performance of a processing unit (e.g., processor 106, controller 126, and/or a processor associated with controller 126), improving processing efficiency of such processing unit, and/or reducing an amount of time for the processing unit to perform a focusing process to determine the optimal focal position to view/inspect a DUT.

It is to be appreciated that microscope focusing system 102 can perform an image processing and microscope focusing process utilizing various combinations of electrical components, mechanical components, and circuitry that cannot be replicated in the mind of a human or performed by a human (e.g., such image processing and microscope focusing process is greater than the capability of a human mind). For example, the amount of data processed, the speed of processing such data, and/or the types of data processed by microscope focusing system 102 over a certain period of time can be greater, faster, and/or different than the amount, speed, and/or data type that can be processed by a human mind over the same period of time.

According to several embodiments, microscope focusing system 102 can also be fully operational towards performing one or more other functions (e.g., fully powered on, fully executed, etc.) while also performing the above-referenced image processing and microscope focusing process. It should also be appreciated that microscope focusing system 102 can include information that is impossible to obtain manually by an entity, such as a human user. For example, the type, amount, and/or variety of information included in one or more sample images 108 and/or one or more sub-images 110 can be more complex than information obtained manually by a human user.

Figure 3:
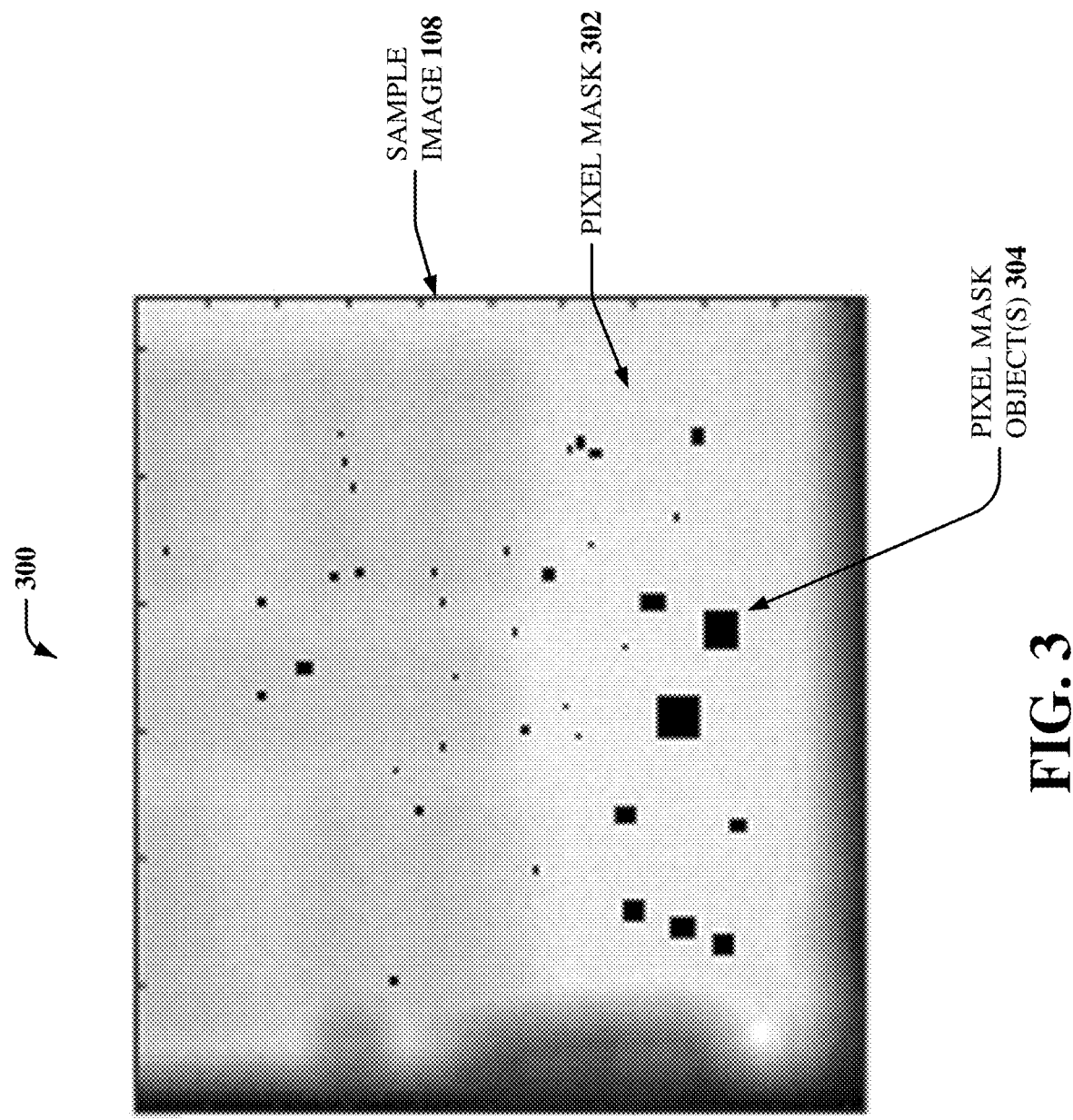
FIG. 3 illustrates a non-limiting example image of microscope focusing components in accordance with one or more embodiments described herein.

FIG. 3 illustrates a non-limiting example image 300 of microscope focusing components in accordance with one or more embodiments described herein. Repetitive description of like elements employed in respective embodiments is omitted for sake of brevity. In some embodiments, image 300 can comprise a sample image 108 comprising a pixel mask 302 that can be superimposed thereon. In several embodiments, pixel mask 302 can comprise one or more pixel mask objects 304.

As described above with reference to pixel mask component 202 and FIG. 2, according to numerous embodiments, pixel mask component 202 can generate a pixel mask 302 that can mask, exclude, and/or remove one or more pixel locations and/or artifacts of respective sample images 108, respective sub-images 110, and/or respective images/sub-images comprising image gradients determined by analyzer component 112 (e.g., via applying a Laplacian derivative). FIG. 3 illustrates an example of a pixel mask 302 comprising multiple pixel mask objects 304 that can mask multiple pixel locations and/or artifacts appearing on sample image 108. For example, pixel mask objects 304 can constitute a pixel mask 302, which can constitute a layer of one or more single/multidimensional objects and/or shapes having solid fill schemes (e.g., as described above with reference to pixel mask component 202 and FIG. 2) and/or other prefixed values (e.g., Not-A-Number (NaN), None, etc.). In some embodiments, pixel mask 302 and/or pixel mask objects 304 can be stored on memory 104 (e.g., as described above). In some embodiments, pixel mask component 202 can apply pixel mask 302 and/or pixel mask objects 304 to a sample image 108 and/or sub-image 110 before such images are analyzed by analyzer component 112 (e.g., as described above).

Figure 4:
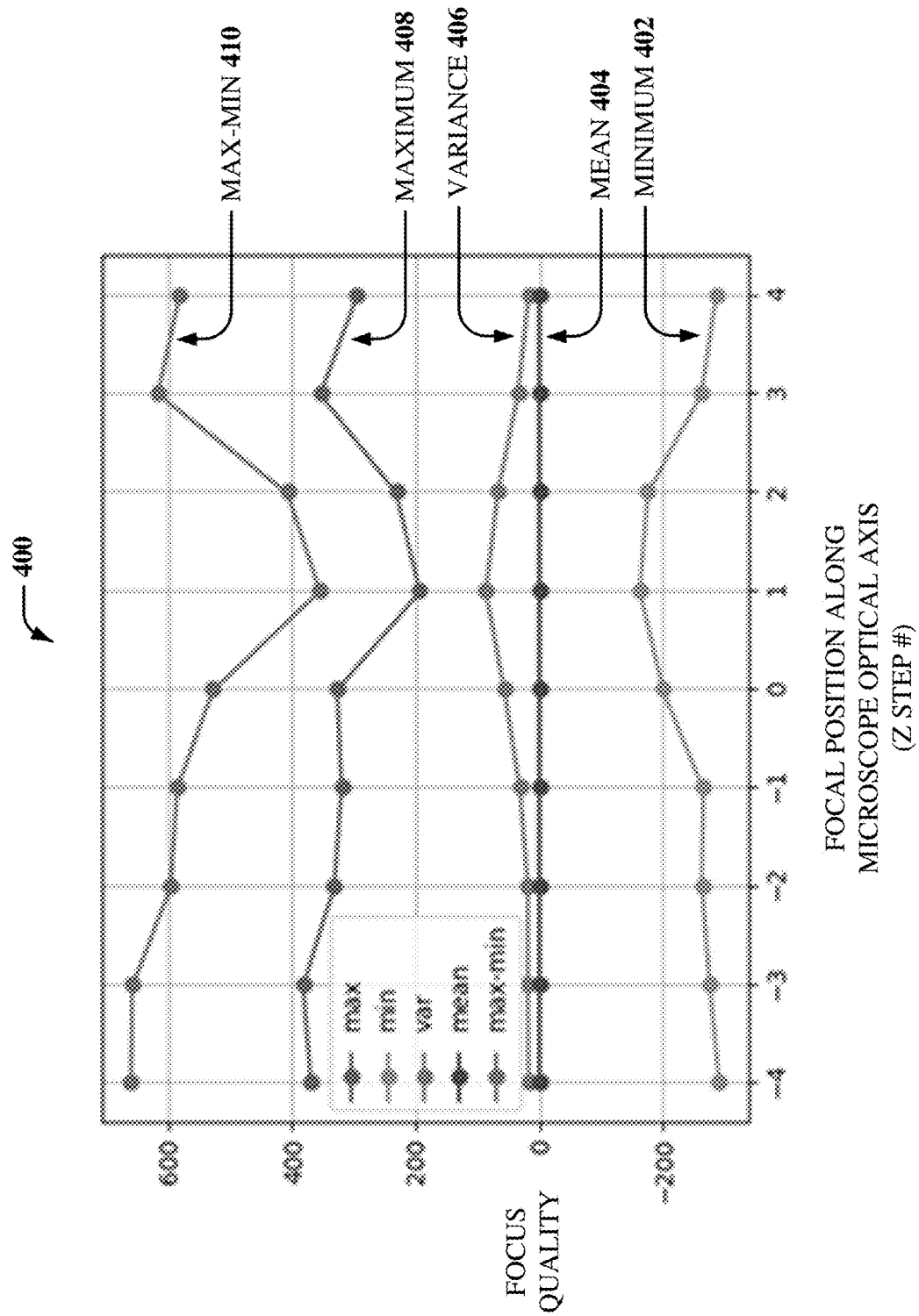
FIG. 4 illustrates a non-limiting example information of microscope focusing components in accordance with one or more embodiments described herein.

FIG. 4 illustrates a non-limiting example information 400 of microscope focusing components in accordance with one or more embodiments described herein. Repetitive description of like elements employed in respective embodiments is omitted for sake of brevity.

As described above with reference to analyzer component 112 and FIG. 1, according to numerous embodiments, analyzer component 112 can determine and/or employ one or more global parameters of one or more gradient derivatives (e.g., a Laplacian derivative) to analyze sample images 108 and/or sub-images 110. For example, analyzer component 112 can determine and/or employ global parameters including, but not limited to, minimum 402, mean 404, variance 406, maximum 408, and/or max-min 410 of the gradient derivatives of respective sample images 108 and/or respective sub-images 110. In some embodiments, analyzer component 112 can determine and/or employ variance 406 of the Laplacian derivatives of respective sample images 108 and/or respective sub-images 110 to determine a focus quality figure of merit that can serve as a baseline to which one or more sample images 108 and/or one or more sub-images 110 can be compared. For example, as illustrated in FIG. 4, variance 406 of such Laplacian derivatives provides the optimal focus quality figure of merit relative to other global parameters, such as, for example, minimum 402, mean 404, maximum 408, and/or max-min 410.

Figure 5:
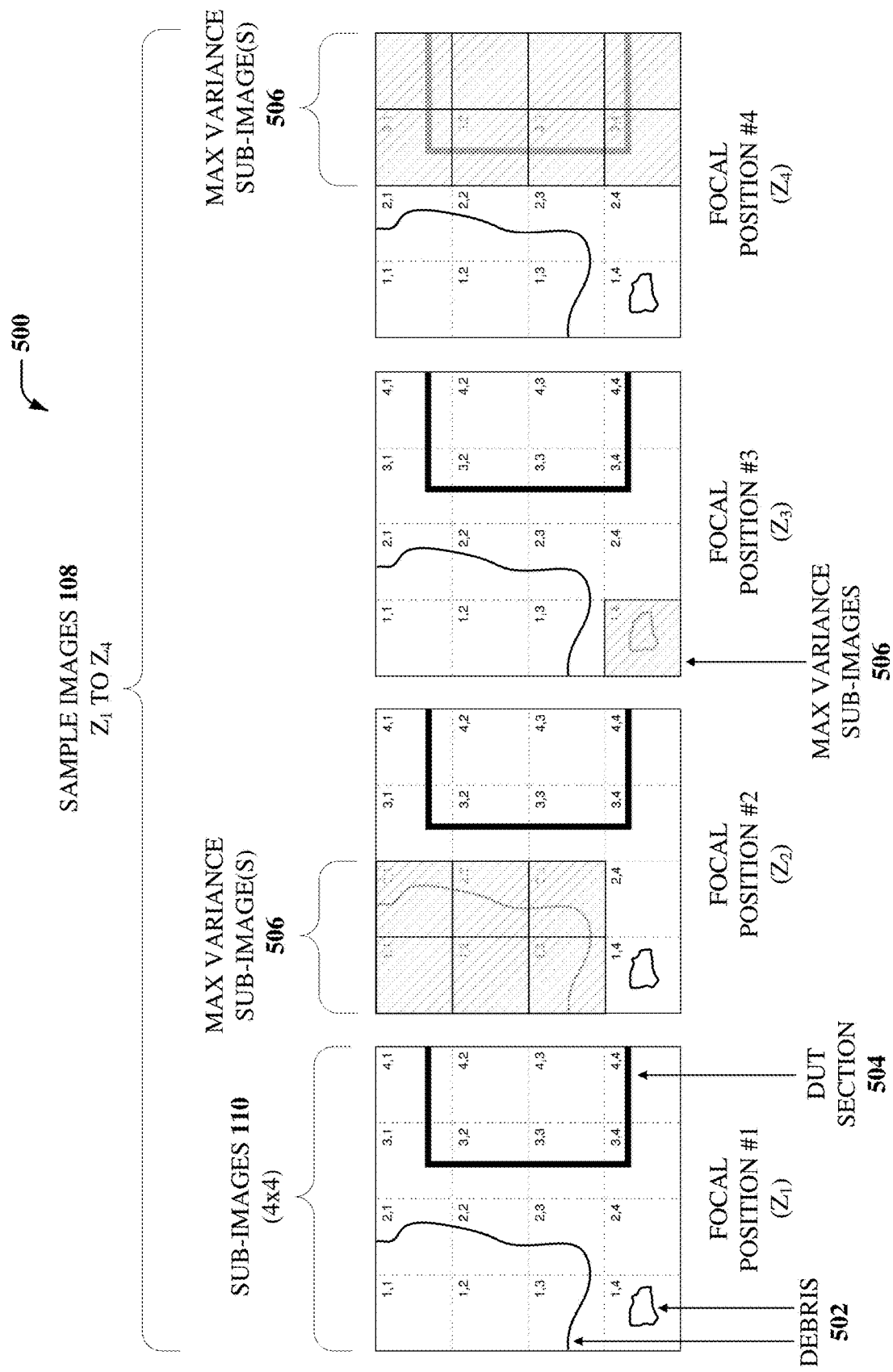
FIG. 5 illustrates a non-limiting example information of microscope focusing components in accordance with one or more embodiments described herein.

FIG. 5 illustrates a non-limiting example information 500 of microscope focusing components in accordance with one or more embodiments described herein. Repetitive description of like elements employed in respective embodiments is omitted for sake of brevity.

In some embodiments, information 500 can comprise sample images 108 acquired/captured (e.g., by imaging device 124) at various focal positions along an optical axis/Z-axis of microscope 122 (e.g., focal position #1 ($Z_1$), focal position #2 ($Z_2$), focal position #3 ($Z_3$), focal position #4 ($Z_4$), etc.). In some embodiments, sample images 108 can comprise one or more sub-images 110, one or more debris 502, one or more DUT section 504, and/or one or more max variance sub-images 506.

As described above with reference to microscope focusing system 102 and FIG. 1, according to multiple embodiments, microscope focusing system 102 can apply one or more grid patterns to individual sample images 108 (e.g., a grid pattern comprising 4×4 sub-images, as depicted in FIG. 5). In some embodiments, such a grid pattern comprising 4×4 sub-images can constitute sub-images 110. In some embodiments, debris 502 can comprise debris particles (e.g., dust, glue, fingerprints, etc.) on a surface of a DUT. In some embodiments, DUT section 504 can comprise one or more sections of a DUT that can be of interest, for example, to an observer viewing and/or inspecting such DUT (e.g., via microscope system 120 and/or microscope 122).

As described above with reference to analyzer component 112 and FIG. 1, according to multiple embodiments, analyzer component 112 can identify a sub-image of sub-images 110 having a maximized variance of the Laplacian derivative(s) corresponding to such sub-images 110. For example, analyzer component 112 can analyze all sub-images 110 defined as sub-image 1,1 of respective sample images 108 depicted in FIG. 5. For instance, analyzer component 112 can analyze sub-image 1,1 of respective sample images 108 acquired/captured at focal position #1, at focal position #2, at focal position #3, and/or at focal position #4 depicted in FIG. 5. In such an example, analyzer component 112 can compare sub-image 1,1 of all such respective sample images 108 to identify which sample image 108 comprises a sub-image 1,1 having a max variance sub-image 506 (e.g., which focal position maximizes the variance of the Laplacian derivative(s) corresponding to such sub-images 110 defined as sub-image 1,1). In some embodiments, analyzer component 112 can facilitate denoting one or more max variance sub-images 506 identified by analyzer component 112 as described above. For example, analyzer component 112 can facilitate denoting one or more max variance sub-images 506 with a hatched pattern as depicted in FIG. 5. For instance, with respect to sub-image 1,1 at focal position #2, analyzer component 112 can facilitate denoting such a sub-image with a hatched pattern to indicate that sub-image 1,1 at focal position #2 comprises a max variance sub-image 506 (e.g., as illustrated by the hatched pattern of sub-image 1,1 at focal position #2 depicted in FIG. 5).

As described above with reference to selection component 114 and FIG. 1, according to multiple embodiments, selection component 114 can select an image, from sample images 108, that comprises one or more sub-images 110 having a maximized variance of the Laplacian derivative(s) corresponding to such one or more sub-images 110. For example, with reference to FIG. 5, selection component 114 can select an image, from sample images 108 corresponding to focal position #1 to focal position #4, that comprises one or more max variance sub-images 506.

In some embodiments, selection component 114 can select such an image based on a quantity (e.g., largest quantity) of max variance sub-images 506 identified in such an image (e.g., identified by analyzer component 112 as described above). For example, with reference to FIG. 5, selection component 114 can select sample image 108 acquired/captured at focal position #4, as such image comprises the largest quantity of max variance sub-images 506 identified by analyzer component 112.

In some embodiments, selection component 114 can select such an image based on a ranking value assigned to max variance sub-images 506 identified in such an image. For example, as described above with reference to selection component 114 and FIG. 1, a high-ranking value (e.g., a numerical value of 10) can be assigned (e.g., via microscope focusing system 102, analyzer component 112, and/or selection component 114) to individual sub-images 110 comprising/illustrating only a DUT or a portion thereof. For example, with reference to FIG. 5, a high-ranking value can be assigned to sub-images 110 comprising DUT section 504, as such sub-images can be of greater interest to an observer viewing and/or inspecting such DUT. For instance, a high-ranking value can be assigned to sub-images: 3,1; 3,2; 3,3; 3,4; 4,1; 4,2; 4,3; and/or 4,4 depicted in FIG. 5. In such an example, selection component 114 can select sample image 108 acquired/captured at focal position #4, as such image comprises max variance sub-images 506 identified by analyzer component 112 that correspond to sub-images 110 comprising DUT section 504, and therefore, have high-ranking values.

Figure 6:
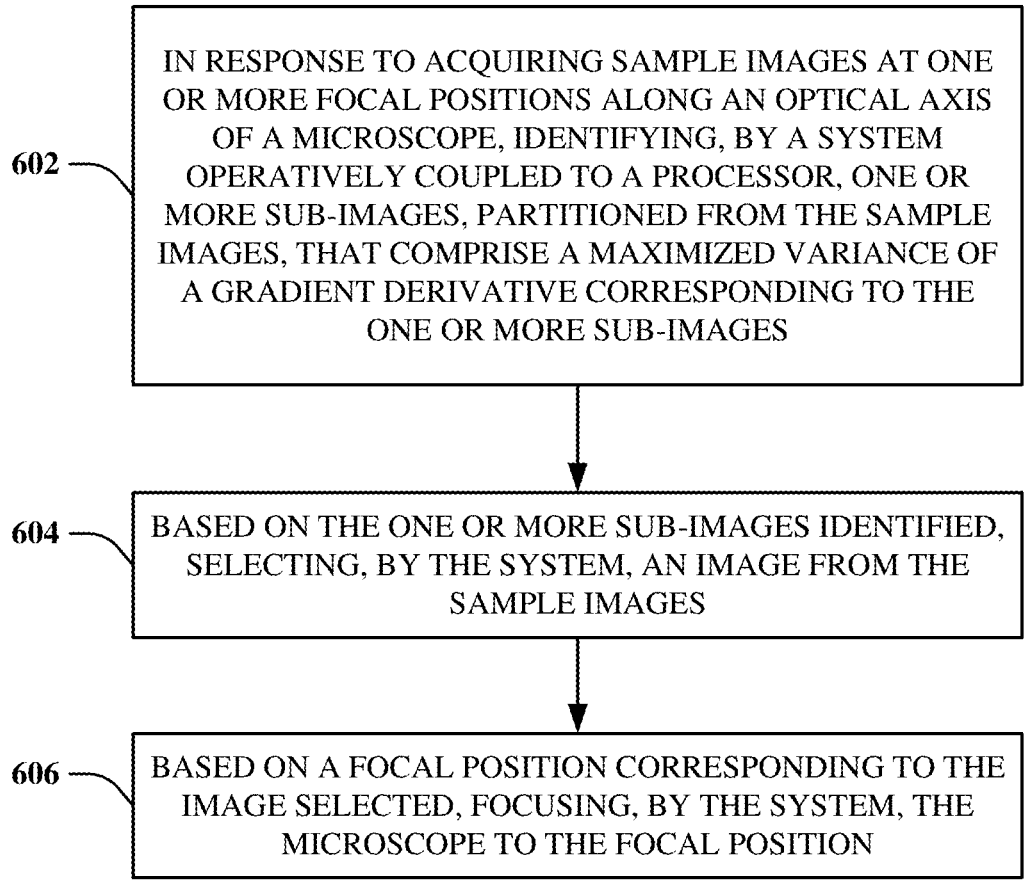
FIG. 6 illustrates a flow diagram of an example, non-limiting computer-implemented method that facilitates microscope focusing components in accordance with one or more embodiments described herein.

FIG. 6 illustrates a flow diagram of an example, non-limiting computer-implemented method 600 that facilitates microscope focusing components in accordance with one or more embodiments described herein. Repetitive description of like elements employed in other embodiments described herein is omitted for sake of brevity.

At 602, in response to acquiring sample images (e.g., sample images 108) at one or more focal positions along an optical axis of a microscope (e.g., microscope 122), identifying, by a system (e.g., via microscope focusing system 102 and/or analyzer component 112) operatively coupled to a processor (e.g., processor 106), one or more sub-images (e.g., sub-images 110), partitioned from the sample images, that comprise a maximized variance of a gradient derivative corresponding to the one or more sub-images. In some embodiments, microscope focusing system 102 and/or analyzer component 112 can determine and/or employ the variance of Laplacian derivative(s) corresponding to such respective sub-images 110 to identify one or more sub-images 110 that comprise a maximized variance of a gradient derivative (e.g., as described above with reference to analyzer component 112 and FIG. 1).

At 604, based on the one or more sub-images identified, selecting, by the system (e.g., via microscope focusing system 102 and/or selection component 114), an image from the sample images. In some embodiments, microscope focusing system 102 and/or selection component 114 can execute such selection based on a quantity of sub-images 110 identified in such image as having a maximized variance of the Laplacian derivative(s) and/or based on a ranking value assigned to one or more sub-images 110 identified in such image as having a maximized variance of the Laplacian derivative(s) (e.g., as described above with reference to selection component 114 and FIG. 1).

At 606, based on a focal position corresponding to the image selected, focusing, by the system (e.g., via microscope focusing system 102 and/or focus component 116), the microscope to the focal position. In some embodiments, microscope focusing system 102 and/or focus component 116 can employ controller 126 to facilitate: moving a stage of microscope 122 to such focal position; adjusting an objective of microscope 122 to such focal position; and/or adjusting an eyepiece of microscope 122 to such focal position (e.g., as described above with reference to focus component 116 and FIG. 1).

Figure 7:
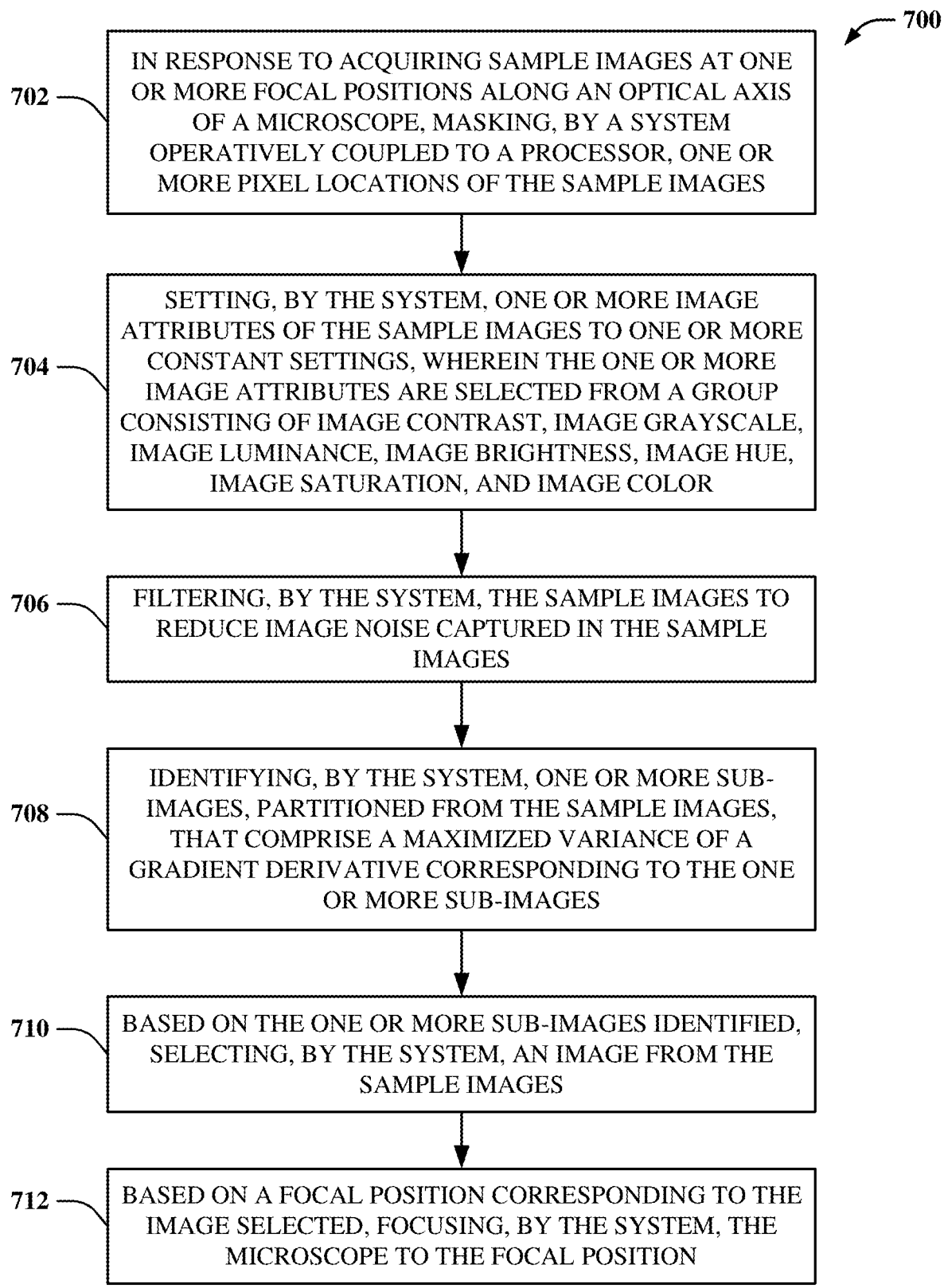
FIG. 7 illustrates a flow diagram of an example, non-limiting computer-implemented method that facilitates microscope focusing components in accordance with one or more embodiments described herein.

FIG. 7 illustrates a flow diagram of an example, non-limiting computer-implemented method 700 that facilitates microscope focusing components in accordance with one or more embodiments described herein. Repetitive description of like elements employed in other embodiments described herein is omitted for sake of brevity.

At 702, in response to acquiring sample images (e.g., sample images 108) at one or more focal positions along an optical axis of a microscope (e.g., microscope 122), masking, by a system (e.g., via microscope focusing system 102 and/or pixel mask component 202) operatively coupled to a processor (e.g., processor 106), one or more pixel locations of the sample images. In some embodiments, microscope focusing system 102 and/or pixel mask component 202 can facilitate masking one or more artifacts appearing on a sample image 108 and/or a sub-image 110 by superimposing, over such artifacts, a layer of one or more single-dimensional and/or multidimensional objects and/or shapes having solid fill schemes (e.g., as described above with reference to pixel mask component 202 and FIG. 2).

At 704, setting, by the system (e.g., via microscope focusing system 102 and/or equalizer component 204), one or more image attributes of the sample images to one or more constant settings. Examples of such image attributes can include, but are not limited to, image contrast, image grayscale, image luminance, image brightness, image hue, image saturation, and/or another image attribute.

At 706, filtering, by the system (e.g., via microscope focusing system 102 and/or filter component 206), the sample images to reduce image noise captured in the sample images. In some embodiments, microscope focusing system 102 and/or filter component 206 can apply a high frequency noise filter and/or a low pass filter (e.g., a Gaussian filter) to sample images 108 and/or sub-images 110 to reduce and/or eliminate such image noise acquired/captured in such images (e.g., as described above with reference to filter component 206 and FIG. 2).

At 708, identifying, by the system (e.g., via microscope focusing system 102 and/or analyzer component 112), one or more sub-images (e.g., sub-images 110), partitioned from the sample images, that comprise a maximized variance of a gradient derivative corresponding to the one or more sub-images. In some embodiments, microscope focusing system 102 and/or analyzer component 112 can determine and/or employ the variance of Laplacian derivative(s) corresponding to such respective sub-images 110 to identify one or more sub-images 110 that comprise a maximized variance of a gradient derivative (e.g., as described above with reference to analyzer component 112 and FIG. 1).

At 710, based on the one or more sub-images identified, selecting, by the system (e.g., via microscope focusing system 102 and/or selection component 114), an image from the sample images. In some embodiments, microscope focusing system 102 and/or selection component 114 can execute such selection based on a quantity of sub-images 110 identified in such image as having a maximized variance of the Laplacian derivative(s) and/or based on a ranking value assigned to one or more sub-images 110 identified in such image as having a maximized variance of the Laplacian derivative(s) (e.g., as described above with reference to selection component 114 and FIG. 1).

At 712, based on a focal position corresponding to the image selected, focusing, by the system (e.g., via microscope focusing system 102 and/or focus component 116), the microscope to the focal position. In some embodiments, microscope focusing system 102 and/or focus component 116 can employ controller 126 to facilitate: moving a stage of microscope 122 to such focal position; adjusting an objective of microscope 122 to such focal position; and/or adjusting an eyepiece of microscope 122 to such focal position (e.g., as described above with reference to focus component 116 and FIG. 1).

Figure 8:
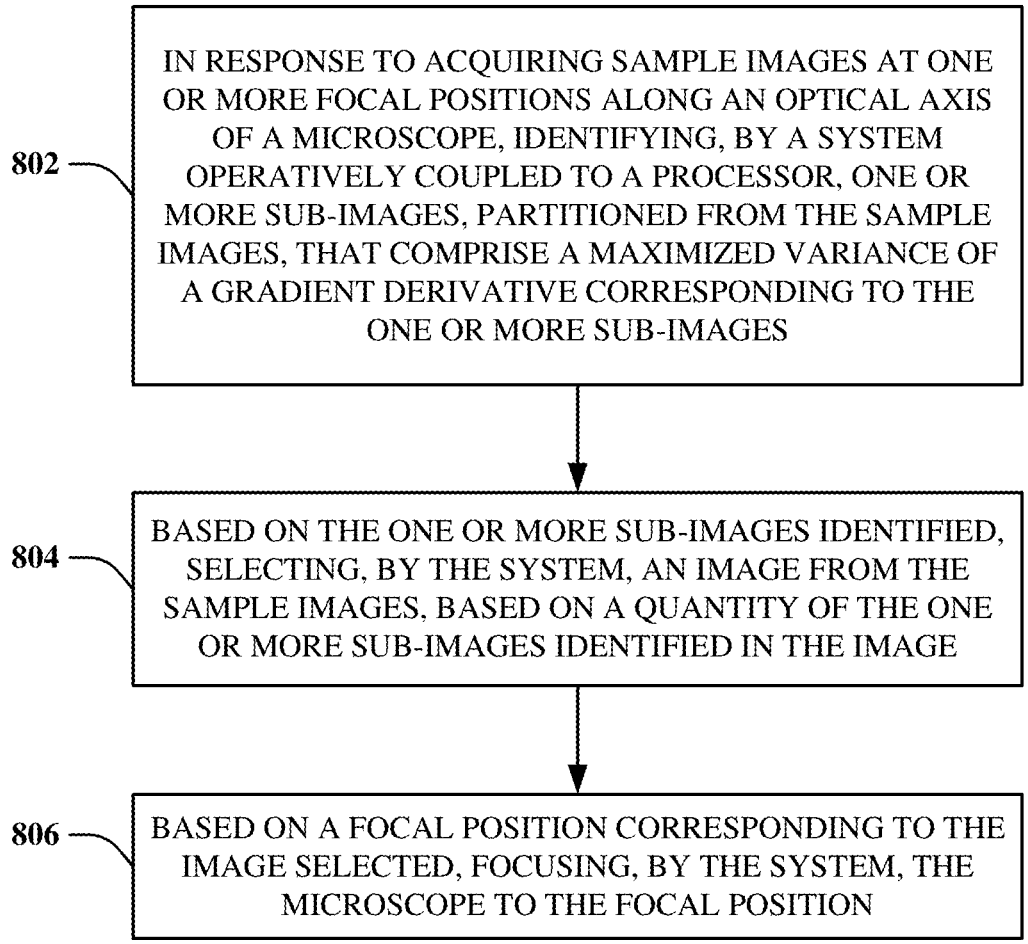
FIG. 8 illustrates a flow diagram of an example, non-limiting computer-implemented method that facilitates microscope focusing components in accordance with one or more embodiments described herein.

FIG. 8 illustrates a flow diagram of an example, non-limiting computer-implemented method 800 that facilitates microscope focusing components in accordance with one or more embodiments described herein. Repetitive description of like elements employed in other embodiments described herein is omitted for sake of brevity.

At 802, in response to acquiring sample images (e.g., sample images 108) at one or more focal positions along an optical axis of a microscope (e.g., microscope 122), identifying, by a system (e.g., via microscope focusing system 102 and/or analyzer component 112) operatively coupled to a processor (e.g., processor 106), one or more sub-images (e.g., sub-images 110), partitioned from the sample images, that comprise a maximized variance of a gradient derivative corresponding to the one or more sub-images. In some embodiments, microscope focusing system 102 and/or analyzer component 112 can determine and/or employ the variance of Laplacian derivative(s) corresponding to such respective sub-images 110 to identify one or more sub-images 110 that comprise a maximized variance of a gradient derivative (e.g., as described above with reference to analyzer component 112 and FIG. 1).

At 804, based on the one or more sub-images identified, selecting, by the system (e.g., via microscope focusing system 102 and/or selection component 114), an image from the sample images, based on a quantity (e.g., largest quantity) of the one or more sub-images identified in the image (e.g., as described above with reference to selection component 114 and FIG. 1).

At 806, based on a focal position corresponding to the image selected, focusing, by the system (e.g., via microscope focusing system 102 and/or focus component 116), the microscope to the focal position. In some embodiments, microscope focusing system 102 and/or focus component 116 can employ controller 126 to facilitate: moving a stage of microscope 122 to such focal position; adjusting an objective of microscope 122 to such focal position; and/or adjusting an eyepiece of microscope 122 to such focal position (e.g., as described above with reference to focus component 116 and FIG. 1).

Figure 9:
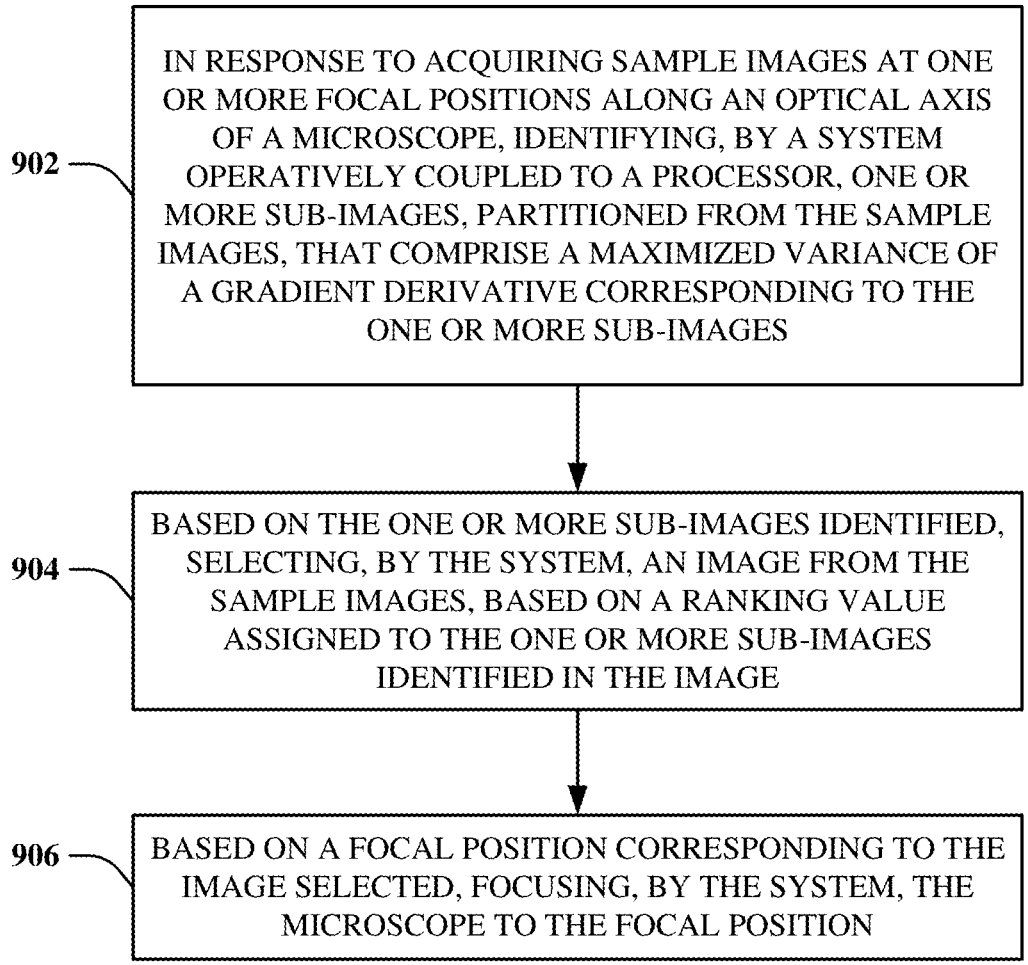
FIG. 9 illustrates a flow diagram of an example, non-limiting computer-implemented method that facilitates microscope focusing components in accordance with one or more embodiments described herein.

FIG. 9 illustrates a flow diagram of an example, non-limiting computer-implemented method 900 that facilitates microscope focusing components in accordance with one or more embodiments described herein. Repetitive description of like elements employed in other embodiments described herein is omitted for sake of brevity.

At 902, in response to acquiring sample images (e.g., sample images 108) at one or more focal positions along an optical axis of a microscope (e.g., microscope 122), identifying, by a system (e.g., via microscope focusing system 102 and/or analyzer component 112) operatively coupled to a processor (e.g., processor 106), one or more sub-images (e.g., sub-images 110), partitioned from the sample images, that comprise a maximized variance of a gradient derivative corresponding to the one or more sub-images. In some embodiments, microscope focusing system 102 and/or analyzer component 112 can determine and/or employ the variance of Laplacian derivative(s) corresponding to such respective sub-images 110 to identify one or more sub-images 110 that comprise a maximized variance of a gradient derivative (e.g., as described above with reference to analyzer component 112 and FIG. 1).

At 904, based on the one or more sub-images identified, selecting, by the system (e.g., via microscope focusing system 102 and/or selection component 114), an image from the sample images, based on a ranking value (e.g., high-ranking value) assigned to the one or more sub-images identified in the image (e.g., as described above with reference to selection component 114 and FIG. 1).

At 906, based on a focal position corresponding to the image selected, focusing, by the system (e.g., via microscope focusing system 102 and/or focus component 116), the microscope to the focal position. In some embodiments, microscope focusing system 102 and/or focus component 116 can employ controller 126 to facilitate: moving a stage of microscope 122 to such focal position; adjusting an objective of microscope 122 to such focal position; and/or adjusting an eyepiece of microscope 122 to such focal position (e.g., as described above with reference to focus component 116 and FIG. 1).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 10:
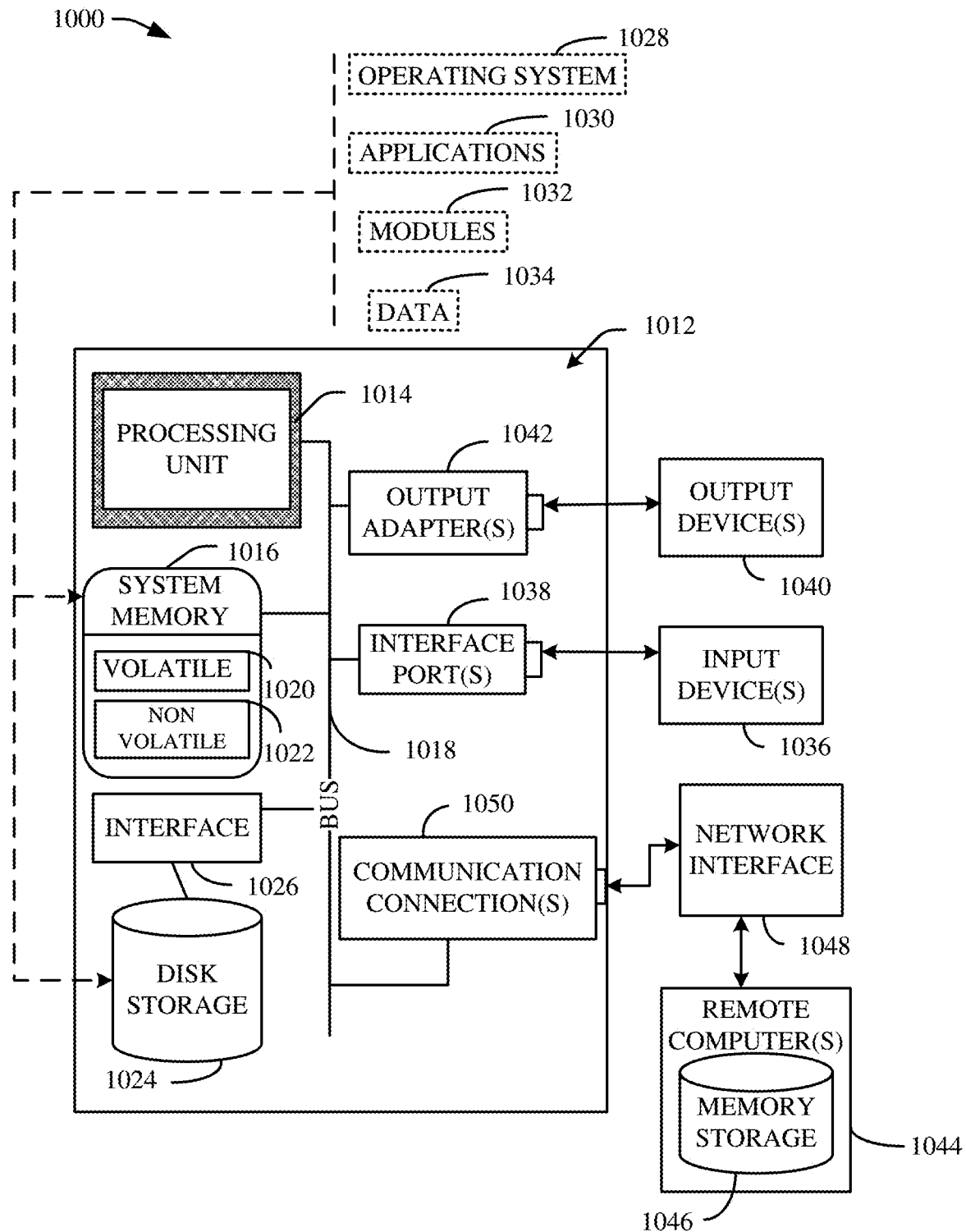
FIG. 10 illustrates a block diagram of an example, non-limiting operating environment in which one or more embodiments described herein can be facilitated.

In order to provide a context for the various aspects of the disclosed subject matter, FIG. 10 as well as the following discussion are intended to provide a general description of a suitable environment in which the various aspects of the disclosed subject matter can be implemented. FIG. 10 illustrates a block diagram of an example, non-limiting operating environment in which one or more embodiments described herein can be facilitated. Repetitive description of like elements employed in other embodiments described herein is omitted for sake of brevity.

With reference to FIG. 10, a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media. To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012.

System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor based appliance, a peer device or other common network node and the like, and typically can also include many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, singlecore processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        an analyzer component that:
            partitions sample images into a grid pattern comprising equally sized sub-images, wherein each sample image of the sample images is acquired at different focal positions along an optical axis of a microscope;
            for each grid location of the grid pattern:
                analyzes corresponding sub-images at the grid location of the sample images,
                identifies whether any sub-image of the corresponding sub-images has a maximized variance of a gradient derivative,
                in response to identification of a sub-image of the corresponding sub-images that has the maximized variance of the gradient derivative, denotes a sample image comprising the identified sub-image as having the maximized variance of the gradient derivative for the grid location;
        a selection component that selects an image, from the sample images, that comprises a highest quantity of grid locations denoted as having the maximized variance of the gradient derivative; and
        a focus component that, based on a focal position corresponding to the image selected, focuses the microscope to the focal position.

2. The system of claim 1, wherein the gradient derivative is selected from a group consisting of a Laplacian derivative, a Sobel derivative, and a Scharr derivative.

3. The system of claim 1, wherein the selection component selects the image further based on a ranking value assigned to the one or more sub-images identified as having the maximized variance of the gradient derivative in the image.

4. The system of claim 1, further comprising a pixel mask component that masks one or more pixel locations of the sample images.

5. The system of claim 1, further comprising an equalizer component that sets one or more image attributes of the sample images to one or more constant settings, wherein the one or more image attributes are selected from a group consisting of image contrast, image grayscale, image luminance, image brightness, image hue, and image saturation.

6. The system of claim 1, further comprising a filter component that filters the respective sample images to reduce image noise captured in the respective sample images.

7. The system of claim 1, wherein the sample images comprise reflected-light pattern images.

8. The system of claim 1, wherein the microscope comprises an optical microscope.

9. The system of claim 1, wherein the sample images comprise images of an electronic device selected from a group consisting of a semiconductor integrated circuit, a semiconductor integrated circuit package, a semiconductor integrated circuit assembly, a semiconductor integrated circuit wafer, and a semiconductor integrated circuit die.

10. A computer-implemented method, comprising:
in response to acquiring sample images at different focal positions along an optical axis of a microscope:
partitioning, by a system operatively coupled to a processor, the sample images into a grid pattern comprising equally sized sub-images,
for each grid location of the grid pattern:
analyzing, by the system, corresponding sub-images at the grid location of the sample images,
identifying, by the system, whether any sub-image of the corresponding sub-images has a maximized variance of a gradient derivative
in response to identification of a sub-image of the corresponding sub-images that has the maximized variance of the gradient derivative, denoting, by the system, a sample image comprising the identified sub-image as having the maximized variance of the gradient derivative for the grid location;
selecting, by the system, an image from the sample images that comprises a highest quantity of grid locations denoted as having the maximized variance of the gradient derivative; and
based on a focal position corresponding to the image selected, focusing, by the system, the microscope to the focal position.

11. The computer-implemented method of claim 10, wherein the gradient derivative is selected from a group consisting of a Laplacian derivative, a Sobel derivative, and a Scharr derivative.

12. The computer-implemented method of claim 10, wherein the selecting comprises selecting, by the system, the image from the sample images, further based on a ranking value assigned to the one or more sub-images identified as having the maximized variance of the gradient derivative in the image.

13. The computer-implemented method of claim 10, further comprising masking, by the system, one or more pixel locations of the sample images.

14. The computer-implemented method of claim 10, further comprising setting, by the system, one or more image attributes of the sample images to one or more constant settings, wherein the one or more image attributes are selected from a group consisting of image contrast, image grayscale, image luminance, image brightness, image hue, and image saturation.

15. The computer-implemented method of claim 10, further comprising filtering, by the system, the sample images to reduce image noise captured in the sample images.

16. The computer-implemented method of claim 10, wherein the sample images comprise reflected-light pattern images of an electronic device selected from a group consisting of a semiconductor integrated circuit, a semiconductor integrated circuit package, a semiconductor integrated circuit assembly, a semiconductor integrated circuit wafer, and a semiconductor integrated circuit die.

17. A computer program product facilitating a microscope focusing process, the computer program product comprising a computer readable storage medium having program instructions embodied therewith, the program instructions executable by a processor to cause the processor to:
partition, by the processor, sample images into a grid pattern comprising equally sized sub-images, wherein each sample image of the sample images is acquired at different focal positions along an optical axis of the microscope;
for each grid location of the grid pattern:
analyze, by the processor, corresponding sub-images at the grid location of the sample images
identify, by the processor, whether any sub-image of the corresponding sub-images has a maximized variance of a gradient derivative
in response to identification of a sub-image of the corresponding sub-images that has the maximized variance of the gradient derivative, denote, by the processor, a sample image comprising the identified sub-image as having the maximized variance of the gradient derivative for the grid location;
select, by the processor, an image from the sample images that comprises a highest quantity of grid locations denoted as having the maximized variance of the gradient derivative; and
based on a focal position corresponding to the image selected, focus, by the processor, a microscope to the focal position.

18. The computer program product of claim 17, wherein the gradient derivative is selected from a group consisting of a Laplacian derivative, a Sobel derivative, and a Scharr derivative.

19. The computer program product of claim 17, wherein the processor selects the image from the sample images further based on a ranking value assigned to the one or more sub-images identified as having the maximized variance of the gradient derivative in the image.

20. The computer program product of claim 17, wherein the sample images comprise reflected-light pattern images of an electronic device selected from a group consisting of a semiconductor integrated circuit, a semiconductor integrated circuit package, a semiconductor integrated circuit assembly, a semiconductor integrated circuit wafer, and a semiconductor integrated circuit die.

* * * * *